United States Patent
He

(10) Patent No.: US 12,323,976 B2
(45) Date of Patent: Jun. 3, 2025

(54) DOWNLINK MONITORING SKIPPING BASED ON A SCHEDULING REQUEST (SR)

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/804,964

(22) Filed: Jun. 1, 2022

(65) Prior Publication Data

US 2023/0397200 A1 Dec. 7, 2023

(51) Int. Cl.
*H04W 72/1273* (2023.01)
*H04W 24/08* (2009.01)
*H04W 72/0453* (2023.01)
*H04W 72/21* (2023.01)

(52) U.S. Cl.
CPC ....... *H04W 72/1273* (2013.01); *H04W 24/08* (2013.01); *H04W 72/0453* (2013.01); *H04W 72/21* (2023.01)

(58) Field of Classification Search
CPC . H04W 24/08; H04W 72/0453; H04W 72/21; H04W 72/1273
See application file for complete search history.

(56) References Cited

U.S. PATENT DOCUMENTS

| | | | | |
|---|---|---|---|---|
| 2009/0221281 A1* | 9/2009 | Tseng | ..................... | H04W 72/21 455/423 |
| 2012/0033628 A1* | 2/2012 | Eriksson | ............... | H04W 72/21 370/329 |
| 2019/0104517 A1* | 4/2019 | Park | ..................... | H04W 72/21 |
| 2023/0119565 A1 | 4/2023 | Hu et al. | | |
| 2023/0300854 A1* | 9/2023 | Agiwal | ................. | H04W 72/12 |

FOREIGN PATENT DOCUMENTS

WO WO-2021253431 A1 12/2021

OTHER PUBLICATIONS

Ericsson: "PDCCH Monitoring Adaptation", 3GPP TSG-RAN2 Meeting #118-e, R2-2205751, 3rd Generation Partnership Project, Mobile Competence Centre, 650, Route Des Lucioles, F-06921 Sophia-Antipolis Cedex, France, vol. RAN WG2, No. eMeeting May 9, 2022-May 20, 2022, Apr. 25, 2022, 9 Pages, XP052139183.
International Search Report and Written Opinion—PCT/US2023/065107—ISA/EPO—Jul. 10, 2023.

* cited by examiner

*Primary Examiner* — James P Duffy
(74) *Attorney, Agent, or Firm* — Norton Rose Fulbright US LLP

(57) ABSTRACT

An apparatus for wireless communication by a user equipment (UE) includes a memory and one or more processors coupled to the memory. The one or more processors are configured to receive one or more control messages configuring the UE to avoid downlink monitoring based on a downlink monitoring skipping mode. The one or more processors are further configured, based on a scheduling request (SR) for a first logical channel (LCH) associated with the UE, to perform the downlink monitoring of a first carrier for an uplink grant that schedules an uplink transmission associated with the SR and to avoid the downlink monitoring according to the downlink monitoring skipping mode for a second carrier associated with a second serving cell of the UE. The first carrier is associated with a first serving cell of the UE.

30 Claims, 6 Drawing Sheets

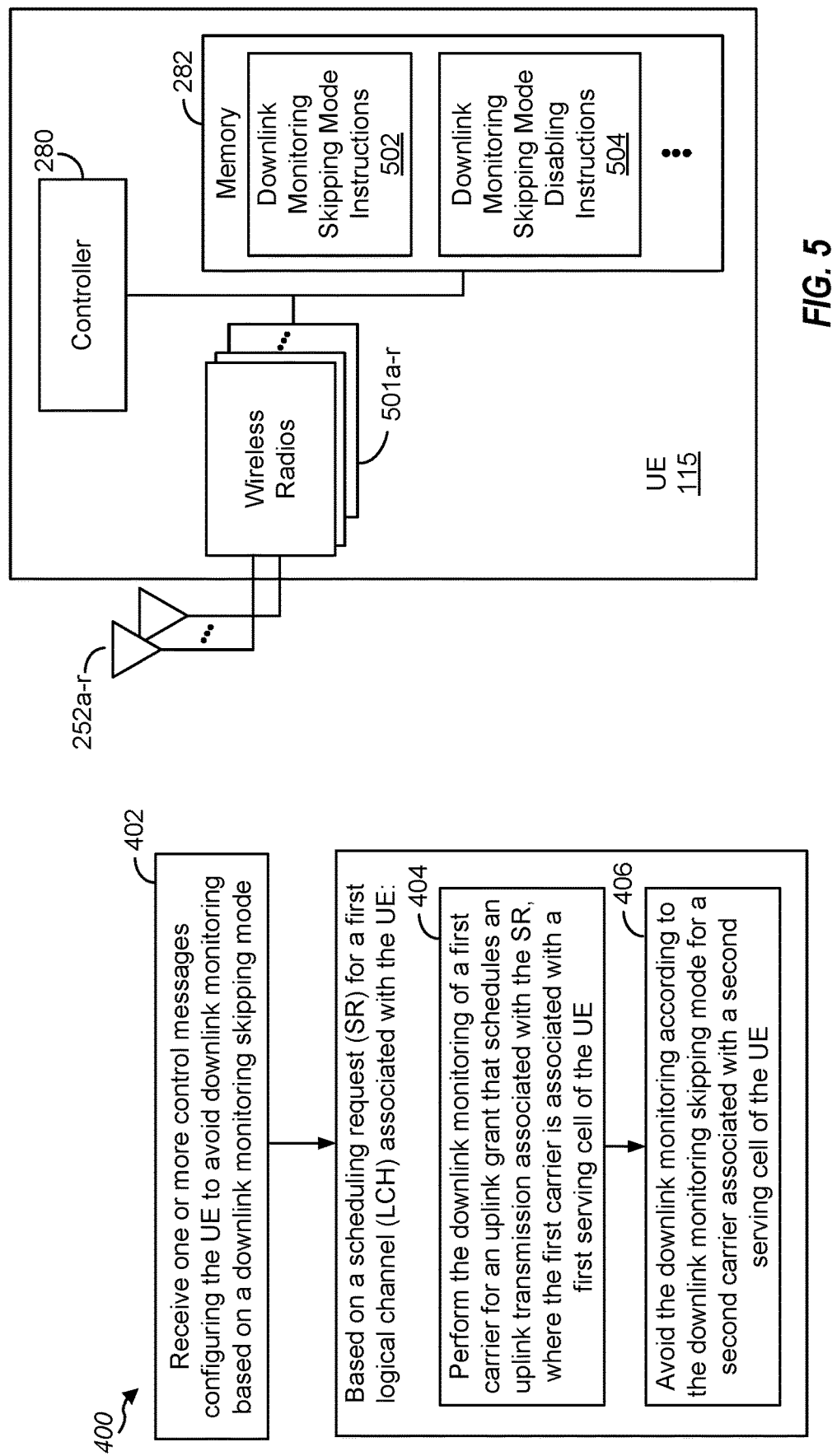

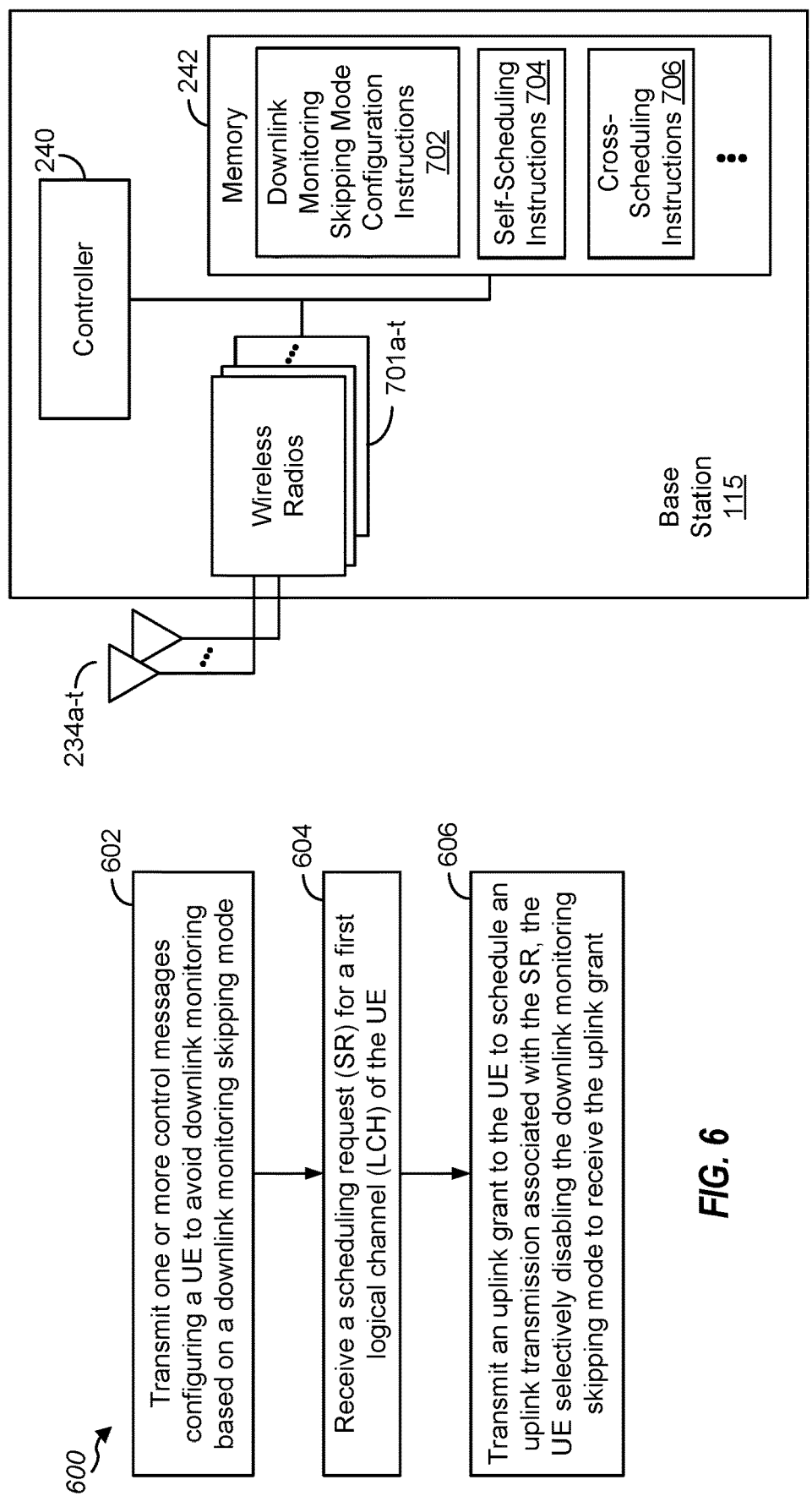

DOWNLINK MONITORING SKIPPING BASED ON A SCHEDULING REQUEST (SR)

TECHNICAL FIELD

Aspects of the present disclosure relate generally to wireless communication systems, and more particularly, to downlink monitoring in wireless communication systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, interference and network congestion may increase with more UEs accessing wireless communication networks. Interference and network congestion may be associated with data loss and latency in some cases. Further, interference and network congestion may increase power consumption, such as by prompting a UE to increase a transmit power setting to overcome interference or to retransmit data in response to network congestion conditions.

One technique for reducing power consumption may involve skipping certain opportunities for wireless communication. For example, a UE may avoid monitoring a channel (or may "skip" monitoring the channel) during one or more monitoring occasions associated with the channel. Skipping monitoring may reduce power consumption of the UE, such as by enabling the UE to operate a receiver based on a sleep mode during the one or more monitoring occasions. In some circumstances, skipping monitoring may cause the UE to fail to receive one or more messages, which may increase latency, reduce throughput, or cause data loss in some cases.

BRIEF SUMMARY OF SOME EXAMPLES

In some aspects of the disclosure, an apparatus for wireless communication by a user equipment (UE) includes a memory and one or more processors coupled to the memory. The one or more processors are configured to receive one or more control messages configuring the UE to avoid downlink monitoring based on a downlink monitoring skipping mode. The one or more processors are further configured, based on a scheduling request (SR) for a first logical channel (LCH) associated with the UE, to perform the downlink monitoring of a first carrier for an uplink grant that schedules an uplink transmission associated with the SR and to avoid the downlink monitoring according to the downlink monitoring skipping mode for a second carrier associated with a second serving cell of the UE. The first carrier is associated with a first serving cell of the UE.

In some other aspects of the disclosure, a method of wireless communication performed by a user equipment (UE) includes receiving one or more control messages configuring the UE to avoid downlink monitoring based on a downlink monitoring skipping mode. The method further includes, based on a scheduling request (SR) for a first logical channel (LCH) associated with the UE, performing the downlink monitoring of a first carrier for an uplink grant that schedules an uplink transmission associated with the SR and avoiding the downlink monitoring according to the downlink monitoring skipping mode for a second carrier associated with a second serving cell of the UE. The first carrier is associated with a first serving cell of the UE.

In some other aspects, an apparatus for wireless communication by a serving cell of a user equipment (UE) includes a memory and one or more processors coupled to the memory. The one or more processors are configured to initiate transmission of one or more control messages configuring a user equipment (UE) to avoid downlink monitoring based on a downlink monitoring skipping mode. The one or more processors are further configured to receive a scheduling request (SR) for a first logical channel (LCH) of the UE. The one or more processors are further configured to initiate transmission of an uplink grant to the UE to schedule an uplink transmission associated with the SR. The UE is configured to selectively disable the downlink monitoring skipping mode to receive the uplink grant.

In some other aspects of the disclosure, a method of wireless communication performed by a serving cell of a user equipment (UE) includes transmitting one or more control messages configuring a user equipment (UE) to avoid downlink monitoring based on a downlink monitoring skipping mode. The method further includes receiving a scheduling request (SR) for a first logical channel (LCH) of the UE. The method further includes transmitting an uplink grant to the UE to schedule an uplink transmission associated with the SR. The UE selectively disables the downlink monitoring skipping mode to receive the uplink grant.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 4 is a flow diagram illustrating an example of a method of wireless communication performed by a UE according to one or more aspects.

FIG. 5 is a block diagram of an example of a UE according to one or more aspects.

FIG. 6 is a flow diagram illustrating an example of a method of wireless communication performed by a serving cell of a UE according to one or more aspects.

FIG. 7 is a block diagram of an example of a base station according to one or more aspects.

DETAILED DESCRIPTION

Figure 1:
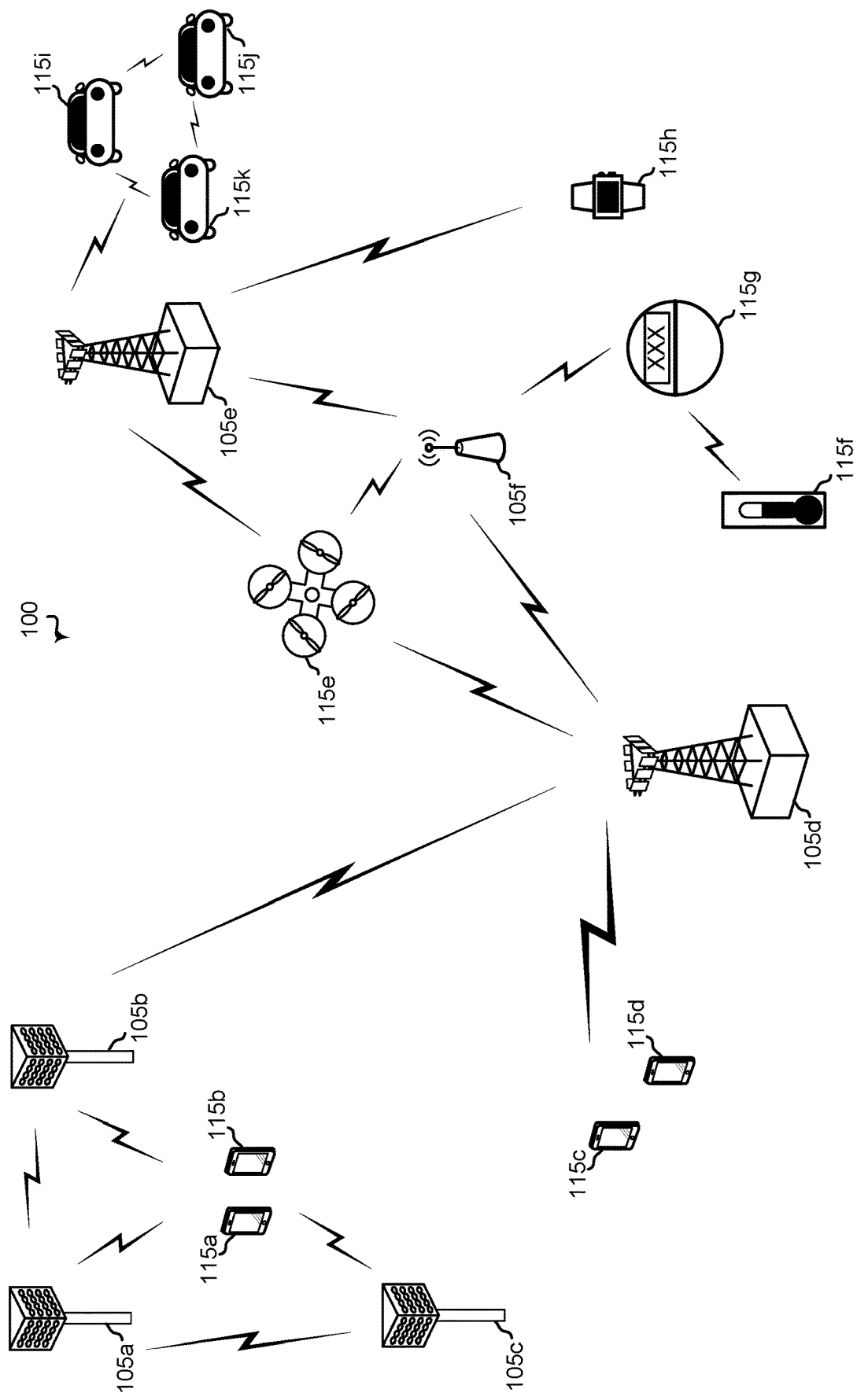
FIG. 1 is a block diagram illustrating an example of a wireless communication system according to one or more aspects.

In some aspects of the disclosure, a UE may selectively disable (or "ignore") downlink monitoring skipping based on a scheduling request (SR) associated with a logical channel (LCH) of the UE. For example, in some implementations, while the SR is pending, the UE may selectively ignore downlink monitoring skipping for at least a first carrier while performing the downlink monitoring skipping for at least a second carrier. The first carrier may be included in a set of one or more grant-eligible carriers on which the UE may potentially receive an uplink grant based on the SR, and the second carrier may be included in a set of one or more grant-ineligible carriers on which the UE may not potentially receive an uplink grant based on the SR.

To illustrate, in some examples, the set of grant-eligible carriers may include a carrier of a serving cell associated with the LCH. Alternatively or in addition, the set of grant-eligible carriers may include a carrier of a scheduling cell that performs scheduling for the one or more serving cells associated with the LCH. Alternatively or in addition, the set of grant-eligible carriers may include a carrier of a serving cell associated with another LCH that shares a common SR configuration as the LCH. Other examples are also within the scope of the disclosure.

By selectively disabling (or ignoring) downlink monitoring skipping based on an SR, a UE may reduce power consumption while avoiding one or more instances of a "missed" communication, such as a missed uplink grant in response to the SR. As a result, performance may be improved as compared to certain other conventional techniques, such as a technique that performs downlink monitoring skipping irrespective of an SR (which may result in a missed uplink grant, increasing latency) or a technique that disables downlink monitoring skipping for all carriers based on an SR (which may increase power consumption).

One or more aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may enable transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, or processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water infrastructure, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
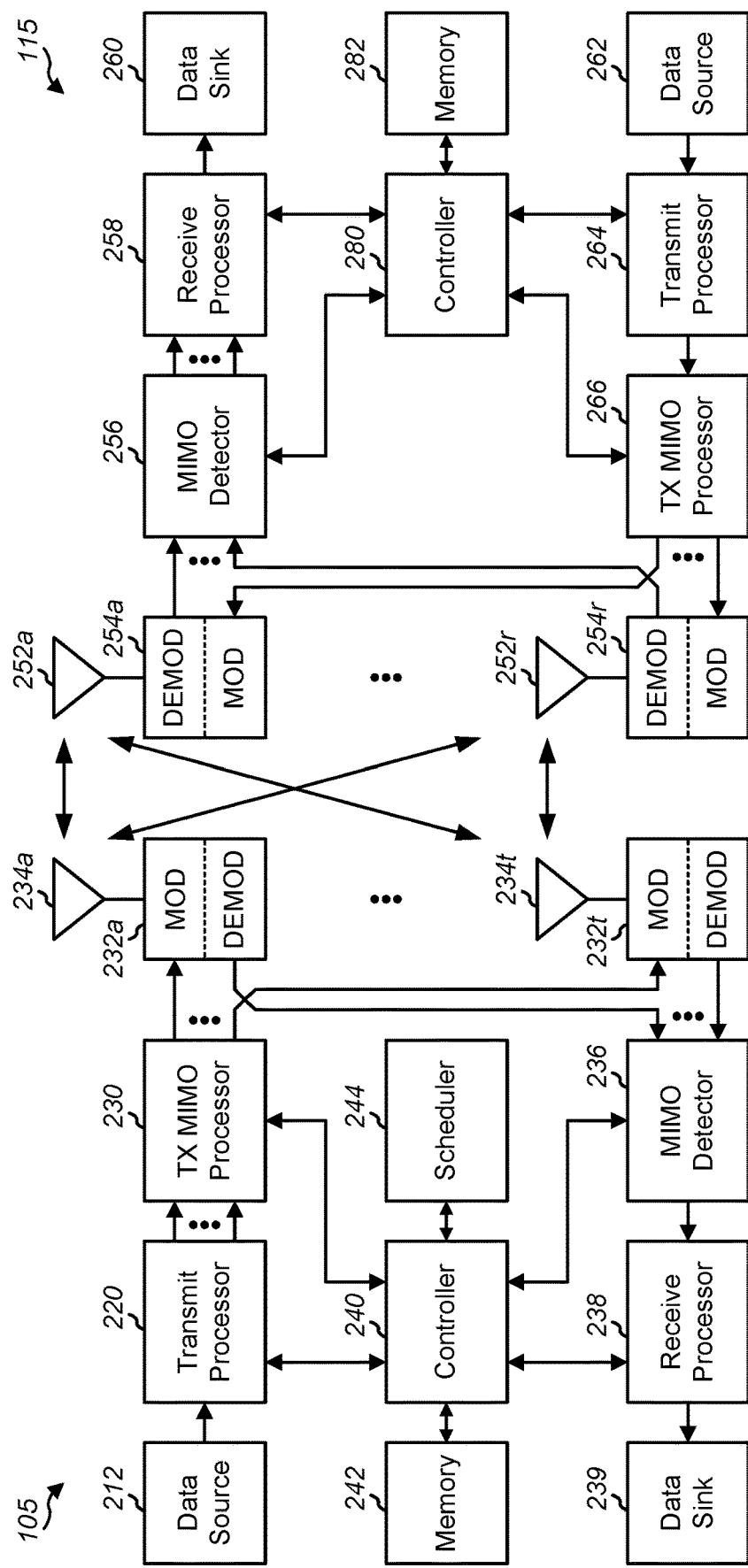
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
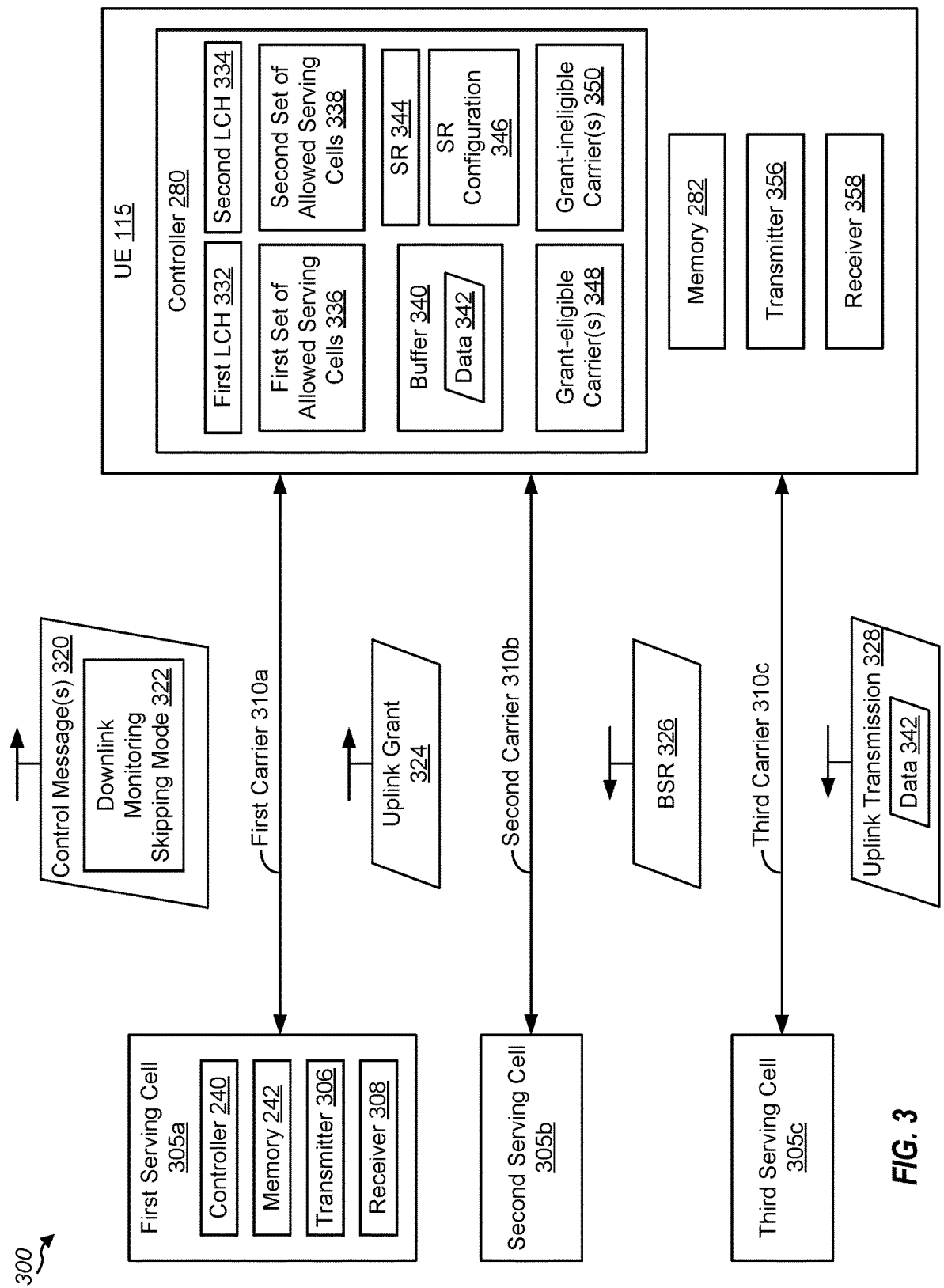
FIG. 3 is a block diagram illustrating an example of a wireless communication system according to one or more aspects.

FIG. 3 is a block diagram illustrating an example of a wireless communication system 300 according to some aspects of the disclosure. The wireless communication system 300 may include one or more base stations (also referred to as cells) and one or more UEs, such as the UE 115. To illustrate, the wireless communication system 300 may include a first serving cell 305*a* of the UE 115, a second serving cell 305*b* of the UE 115, and a third serving cell 305*c* of the UE 115. In some examples, the first serving cell 305*a* may correspond to one of the base stations 105*a-d* of FIG. 1, the second serving cell 305*b* may correspond to another of the base stations 105*a-d* of FIG. 1, and the third serving cell 305*c* may correspond to another of the base stations 105*a-d* of FIG. 1.

Each of the serving cells 305*a-c* may include one or more processors, one or more memories, a transmitter, and a receiver. To illustrate, FIG. 3 depicts that the first serving cell 305*a* may include the controller 240, the memory 242, a transmitter 306, and a receiver 308. The controller 240 may be coupled to the memory 242, to the transmitter 306, and to the receiver 308. In some examples, the transmitter 306 and the receiver 308 may include one or more components described with reference to FIG. 2, such as one or more of the modulator/demodulators 232*a-t*, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 115, and the receiver 308 may be configured to receive signaling, control information, and data from the UE 115.

The UE 115 may include one or more processors (such as the controller 280), a memory (such as the memory 282), a transmitter 356, and a receiver 358. In some examples, the transmitter 356 and the receiver 358 may include one or more components described with reference to FIG. 2, such as one or more of the modulator/demodulators 254*a-r*, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the base station 105, and the receiver 358 may receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

The wireless communication system 300 may use wireless communication channels, which may be specified by one or more wireless communication protocols, such as a 5G NR wireless communication protocol. To illustrate, the base station 105 may communicate with the UE 115 using one or more downlink wireless communication channels (e.g., using one or more of a PDSCH or a PDCCH). The UE 115 may communicate with the base station 105 using one or more uplink wireless communication channels (e.g., using one or more of a PUSCH or a PUCCH).

During operation, the UE 115 may communicate with one or more of the serving cells 305*a-c*. For example, the UE 115 may be configured to communicate with one or more of the serving cells 305*a-c* based on a carrier aggregation (CA) scheme. In some examples of a CA scheme, each of the one or more of the serving cells 305*a-c* may be associated with a respective component carrier (CC) that is used for communication with the UE 115. To illustrate, the first serving cell 305a may be associated with a first carrier 310a (e.g., a first CC), the second serving cell 305b may be associated with a second carrier 310b (e.g., a second CC), and the third serving cell 305c may be associated with a third carrier 310c (e.g., a third CC).

In some examples, one or more of the carriers 310a-c may be used for downlink communications to the UE 115. For example, one or more of the carriers 310a-c may correspond to a PDCCH that carries control information to the UE 115. The UE 115 may monitor such a PDCCH to receive control information, such as data indicating scheduling information, wireless communication resources for use by the UE, other information, or a combination thereof.

In some implementations, the UE 115 may be configured with a downlink monitoring skipping mode 322. For example, the UE 115 may receive (e.g., from any of the serving cells 305a-c or from another base station) one or more control messages 320 (e.g., one or more downlink control information (DCI) messages) configuring the UE 115 with the downlink monitoring skipping mode 322. The downlink monitoring skipping mode 322 may correspond to a PDCCH monitoring skipping mode in which the UE 115 avoids monitoring for PDCCH messages based on the downlink monitoring skipping mode 322. To further illustrate, in some examples, the one or more control messages 320 may indicate a time interval associated with the downlink monitoring skipping mode 322 (e.g., one or more particular downlink monitoring occasions to be skipped, or a particular duration during which the downlink monitoring skipping mode 322 is enabled) and one or more channels or carriers associated with the downlink monitoring skipping mode 322.

In some examples, the one or more control messages may indicate that the downlink monitoring skipping mode 322 is enabled for the carriers 310a-c. In such examples, the UE 115 may avoid monitoring the carriers 310a-c for downlink messages (e.g., PDCCH messages) based on the downlink monitoring skipping mode 322. In some implementations, avoiding downlink monitoring may reduce power consumption of the UE 115, such as by enabling the UE 115 to power down the receiver 358 during a particular time interval, by reducing or avoiding usage of processing resources of the controller 280, or by reducing or avoiding usage of memory resources of the memory 282, as illustrative examples.

In some examples, the UE 115 may communicate with one or more of the serving cells 305a-c based on a logical channel (LCH). To illustrate, the UE 115 may communicate with one or more of the serving cells 305a-c based on a first LCH 332 and a second LCH 334. In some examples, the first LCH 332 and the second LCH 334 may correspond to different applications or may be associated with different usages of wireless communication resources. As a non-limiting example, the first LCH 332 may be associated with a voice application (e.g., a phone call), and the second LCH may be associated with another application, such as an enhanced mobile broadband (eMBB) application. In such examples, the UE 115 may use the first LCH 332 to transmit voice data, and the UE 115 may use the second LCH 334 to transmit eMBB data.

To further illustrate, the UE 115 may generate data 342 associated with an LCH, such as the first LCH 332 or another LCH. For ease of explanation, certain examples are described herein with reference to the data 342 being associated with the first LCH 332. Prior to transmitting the data 342, the UE 115 may buffer the data 342 at a buffer 340 (e.g., a logical buffer). The UE 115 may retain the data 342 at the buffer 340 until obtaining an uplink grant 324 to transmit the data 342, at which time the UE 115 may perform an uplink transmission 328 to transmit the data 342 based on the uplink grant 324.

To obtain the uplink grant 324, the UE 115 may transmit a scheduling request (SR) 344 to a base station, such as any of the serving cells 305a-c. The SR 344 may cause the base station 105 to transmit to the UE 115 the uplink grant 324. In some examples, the uplink grant 324 may schedule resources for the UE 115 to transmit the data 342 to the base station that provides the uplink grant 324 to the UE 115. In this case, the base station may be referred to as a self-scheduled base station (or self-scheduled cell). In another example, the uplink grant 324 may schedule resources for the UE 115 to transmit the data 342 to a different base station other than the base station that provides the uplink grant 324 to the UE 115. In this case, the base station providing the uplink grant 324 may be referred to as a scheduling base station (or scheduling cell), and the base station receiving the data 342 may be referred to as scheduled base station (or scheduled cell). Further, operations performed by the scheduling base station may be referred to as cross-scheduling the scheduled base station.

In some examples, a scheduling base station may schedule the uplink grant 324 based on a logical channel prioritization (LCP) restriction. The LCP restriction may indicate whether the uplink grant 324 may be used for a particular LCH, such as one or more of the first LCH 332 or the second LCH 334. As an illustrative example, if the first LCH 332 corresponds to a voice application, and if the data 342 is associated with the first LCH 332, the scheduling base station may schedule the uplink grant 324, based on the LCP restriction, for a low-band carrier, which may be associated with a greater reliability or coverage as compared to a high-band carrier. In another illustrative example, if the second LCH 334 corresponds to an eMBB application, and if the data 342 is associated with the second LCH 334, the scheduling base station may schedule the uplink grant 324, based on the LCP restriction, for the high-band carrier, which may be associated with a greater bandwidth or throughput as compared to the low-band carrier. In some examples, the low-band carrier corresponds to one of the carriers 310a-c, and the high-band carrier corresponds to another of the carriers 310a-c.

In some cases, by performing downlink monitoring skipping according to the downlink monitoring skipping mode 322, the UE 115 may fail to receive (or "miss") the uplink grant 324. Further, if the UE 115 were to disable (or "ignore") downlink monitoring skipping for each of the carriers 310a-c (e.g., by continuing to monitor the carriers 310a-c), the UE 115 may experience a relatively high power consumption, reducing performance of the UE 115.

In some aspects of the disclosure, based on generating the SR 344, the UE 115 may selectively disable (e.g., "ignore") downlink monitoring skipping for some one or more of the carriers 310a-c while performing downlink monitoring skipping for one or more others of the carriers 310a-c. For example, the UE 115 may monitor one or more carriers on which the UE 115 may potentially receive the uplink grant 324 and may perform downlink monitoring skipping for one or more other carriers on which the UE 115 may not potentially receive the uplink grant 324.

To illustrate, in some examples, the UE 115 may selectively disable downlink monitoring skipping for one or more grant-eligible carriers 348 (e.g., one or more carriers on which the UE 115 may potentially receive the uplink grant 324) and may perform downlink monitoring skipping for one or more grant-ineligible carriers 350 (e.g., one or more carriers on which the UE 115 may not potentially receive the uplink grant 324). The UE 115 may determine the one or more grant-eligible carriers 348 and the one or more grant-ineligible carriers 350 using one or more techniques described herein.

In some examples, the one or more grant-eligible carriers 348 may include a set of allowed serving cells associated with an LCH corresponding to the data 342. To illustrate, the first LCH 332 may be associated with a first set of allowed serving cells 336, and the second LCH 334 may be associated with a second set of allowed serving cells 338. In an illustrative example, if the first LCH 332 is associated with a voice application and the second LCH 334 is associated with an eMBB application, the first set of allowed serving cells 336 may include serving cells associated with low-band carriers, and the second set of allowed serving cells 338 may include serving cells associated with high-band carriers.

To further illustrate, if the data 342 is associated with the first LCH 332, then the UE 115 may expect the uplink grant 324 to be scheduled based on the first set of allowed serving cells 336. In this case, the one or more grant-eligible carriers 348 may include or may correspond to the first set of allowed serving cells 336. In an illustrative example, the first set of allowed serving cells 336 includes the first serving cell 305*a*, and the UE 115 monitors the first carrier 310*a* (e.g., by disabling PDCCH skipping indicated by the downlink monitoring skipping mode 322 for the first carrier 310*a*) during one or more downlink monitoring occasions.

In some such examples, the first serving cell 305*a* may correspond to a self-scheduled cell, where scheduling for the first serving cell 305*a* is performed by the first serving cell 305*a* (e.g., where the first serving cell 305*a* both schedules the uplink grant 324 and receives the data 342 from the UE 115). In some such examples, after receiving the uplink grant 324 from the first serving cell 305*a*, the UE 115 may transmit the data 342 to the first serving cell 305*a* based on the uplink grant 324 (e.g., via the first carrier 310*a*).

In some other examples, different base stations may schedule the uplink grant 324 and receive the data 342 from the UE 115. To illustrate, the first serving cell 305*a* may cross-schedule at least one serving cell that is included in the first set of allowed serving cells 336 (even if the first serving cell 305*a* is not included in the first set of allowed serving cells 336). Accordingly, in some examples, the first serving cell 305*a* may not be included in the first set of allowed serving cells 336, but the first carrier 310*a* may be included in the one or more grant-eligible carriers 348 (because the first serving cell 305*a* is eligible to transmit the uplink grant 324).

In one such example, if the first serving cell 305*a* performs cross-scheduling for the second serving cell 305*b*, the UE 115 may receive the uplink grant 324 from the first serving cell 305*a* via the first carrier 310*a* and may transmit the data 342 to the second serving cell 305*b* via the second carrier 310*b*. In another such example, if the first serving cell 305*a* performs cross-scheduling for the third serving cell 305*c*, the UE 115 may receive the uplink grant 324 from the first serving cell 305*a* via the first carrier 310*a* and may transmit the data 342 to the third serving cell 305*c* via the third carrier 310*c*.

To further illustrate, in some examples, the first serving cell 305*a* may correspond to a downlink-only cell. In such examples, the first serving cell 305*a* may perform cross-scheduling for the at least one serving cell. Alternatively or in addition, the at least one serving cell may correspond to an uplink-only cell that is cross-scheduled by the first serving cell 305*a*. In such examples, the UE 115 may monitor the first carrier 310*a* for the uplink grant 324 (e.g., by disabling PDCCH skipping for the first carrier 310*a* during one or more monitoring occasions) and may transmit the data 342 using a different carrier (such as the second carrier 310*b* or the third carrier 310*c*).

In some implementations, an LCH may be associated with an SR configuration (e.g., a particular set of wireless resources). For example, a base station may configure the UE 115 with an SR configuration 346 associated with the first LCH 332, and the UE 115 may transmit the SR 344 based on the SR configuration 346. Upon receiving the SR 344, a base station may determine, based on the SR configuration 346, that the SR 344 is associated with the first LCH 332 and may schedule the uplink grant 324 for a carrier associated with the first LCH 332 (e.g., by scheduling the uplink grant 324 for a low-band carrier in the case that the first LCH 332 corresponds to a voice application, as an illustrative example).

In some cases, multiple LCHs may be associated with a same SR resource configuration. For example, both the first LCH 332 and the second LCH 334 may be associated with the SR 344. In such cases, a base station receiving the SR 344 may be unable to determine whether the SR 344 is associated with the first LCH 332 or the second LCH 334 (because the SR 344 is associated with both the first LCH 332 and the second LCH 334). In such examples, the base station may schedule the uplink grant 324 either for a carrier associated with the first LCH 332 or for a carrier associated with the second LCH 334. Accordingly, the one or more grant-eligible carriers 348 may include a group of carriers associated with a group of serving cells, and the UE 115 may perform downlink monitoring (e.g., by disabling PDCCH skipping indicated by the downlink monitoring skipping mode 322 during one or more downlink monitoring occasions) of the group of carriers.

In some examples, if the SR configuration 346 is associated with both the first LCH 332 and the second LCH 334, the group of serving cells may correspond to a union of the first set of allowed serving cells 336 and the second set of allowed serving cells 338. In such examples, the UE 115 may perform downlink monitoring (e.g., by disabling PDCCH skipping indicated by the downlink monitoring skipping mode 322 during one or more downlink monitoring occasions) of one or more carriers associated with the first set of allowed serving cells 336 and of one or more carriers associated with the second set of allowed serving cells 338 (even if the data 342 is for the first LCH 332 and not the second LCH 334). To further illustrate, if the first set of allowed serving cells 336 includes the first serving cell 305*a* and if the second set of allowed serving cells 338 includes the second serving cell 305*b*, then the group of serving cells may include the first serving cell 305*a* and the second serving cell 305*b*, and the UE 115 may monitor both the first carrier 310*a* and the second carrier 310*b* for the uplink grant 324.

In some implementations, one or more operations described herein may be performed during pendency of the SR 344 but prior to (or without) transmitting the SR 344. As referred to herein, pendency of the SR 344 may refer to a time interval between occurrence of a trigger condition that is associated with generating the SR 344 and reception of the uplink grant 324 by the UE 115. To illustrate, generating the data 342 or storing of the data 342 to the buffer 340 may initiate pendency of the SR 344 prior to (or without) transmitting the SR 344.

In some aspects of the disclosure, the UE 115 may selectively initiate downlink monitoring of one or more carriers (e.g., by disabling PDCCH skipping indicated by the downlink monitoring skipping mode 322 for the first carrier 310a) for the uplink grant 324 based on detecting completion of transmitting the SR 344. During pendency of the SR 344 and prior to transmitting the SR 344, the UE 115 may continue to perform PDCCH skipping indicated by the downlink monitoring skipping mode 322 for the one or more carriers (e.g., because the UE 115 does not expect to receive the uplink grant 324 until after transmitting the SR 344). As a result, power consumption may be reduced by enabling the UE 115 to perform additional PDCCH skipping during pendency of the SR and prior to completing transmission of the SR 344 (e.g., by avoiding a situation in which the UE 115 disables PDCCH skipping "too early").

In some other cases, an event may occur that is associated with cancelation of an SR. To illustrate, during pendency of the SR 344 and prior to transmitting the SR 344, the UE 115 may transmit a buffer status report (BSR) 326 to a base station, such as any of the serving cells 305a-c. In some examples, the BSR 326 may be included in or may correspond to a BSR medium access control (MAC) control element (CE). In some examples, the BSR 326 includes information related to the buffer 340 (e.g., an amount of data stored at the buffer 340) and information related to LCHs of the UE 115, such as whether the first LCH 332 has data to be transmitted and whether the second LCH 334 has data to be transmitted. A base station receiving the BSR 326 may transmit one or more uplink grants (such as the uplink grant 324) to the UE 115 based on the information indicated by the BSR 326. As a result, transmission of the BSR 326 may be associated with or may cause cancelation of the SR 344 (e.g., because the BSR 326 may result in transmission of the uplink grant 324 without the need for transmitting the SR 344).

In some implementations, a base station receiving the BSR 326 may be unable to determine, based on the BSR 326, which LCH triggered the BSR 326. For example, a wireless communication protocol may not specify that the BSR 326 is to indicate which LCH should be scheduled the uplink grant 324. In such examples, the base station receiving the BSR 326 may schedule the uplink grant 324 for any of multiple carriers, including a carrier not associated with an LCH initiating the BSR 326. As an example, storing the data 342 to the buffer 340 may trigger transmission of the BSR 326 by the UE 115. However, a base station receiving the BSR 326 may not be able to determine that the first LCH 332 triggered the BSR 326 and may in some cases schedule the uplink grant 324 for a carrier not associated with the first LCH 332 (e.g., for a high-band carrier in the case of the first LCH 332 corresponding to a voice application).

In some aspects of the disclosure, if the SR 344 is canceled by transmission of the BSR 326 during pendency of the SR 344, the UE 115 may monitor carriers associated with all serving cells of the UE 115. For example, based on transmitting the BSR 326 during pendency of the SR 344, the UE 115 may disable PDCCH skipping on each of the carriers 310a-c.

In some implementations, the UE 115 determines whether to perform or disable skipping of downlink monitoring based on a particular BSR type associated with the BSR 326. In some examples, based on the particular BSR type corresponding to one of a regular BSR type or to a periodic BSR type, the UE 115 may perform the downlink monitoring for the carriers 310a-c (e.g., by disabling PDCCH skipping for the carriers 310a-c). In these cases, transmission of the BSR 326 may trigger the UE 115 to disable PDCCH skipping. In some other examples, based on the particular BSR type corresponding to a padding BSR type, the UE 115 may avoid performing the downlink monitoring of the carriers 310a-c (e.g., by performing PDCCH skipping according to the downlink monitoring skipping mode 322). In this case, transmission of the BSR 326 may not trigger the UE 115 to perform PDCCH skipping.

One or more features described herein may improve performance of one or more devices within a wireless communication system, such as the wireless communication system 300. For example, by selectively disabling (or ignoring) downlink monitoring skipping based on the SR 344, the UE 115 may reduce power consumption while avoiding one or more instances of a "missed" communication, such as missing of the uplink grant 324. As a result, performance may be improved as compared to certain other conventional techniques, such as a technique that performs downlink monitoring skipping irrespective of an SR (which may result in a missed uplink grant, increasing latency) or a technique that disables downlink monitoring skipping for all carriers based on an SR (which may increase power consumption).

FIG. 4 is a flow diagram illustrating an example of a method 400 of wireless communication performed by a UE according to one or more aspects. In some examples, the method 400 is performed by the UE 115.

The method 400 includes receiving one or more control messages configuring the UE to avoid downlink monitoring based on a downlink monitoring skipping mode, at 402. For example, the UE 115 may receive the one or more control messages 320 configuring the UE 115 with the downlink monitoring skipping mode 322.

The method 400 further includes, based on a scheduling request (SR) for a first logical channel (LCH) associated with the UE, performing the downlink monitoring of a first carrier for an uplink grant that schedules an uplink transmission associated with the SR, at 404. The first carrier is associated with a first serving cell of the UE. For example, the UE 115 may perform downlink monitoring of the first carrier 310a for the uplink grant 324 scheduling the uplink transmission 328, and the first carrier 310a may be associated with the first serving cell 305a.

The method 400 further includes, based on the SR for the first LCH associated with the UE, avoiding the downlink monitoring according to the downlink monitoring skipping mode for a second carrier associated with a second serving cell of the UE, at 406. For example, the UE 115 may avoid downlink monitoring of the second carrier 310b associated with the second serving cell 305b.

FIG. 5 is a block diagram illustrating an example of the UE 115 according to some aspects of the disclosure. The UE 115 may include structure, hardware, or components illustrated in FIG. 2. For example, the UE 115 may include the controller 280, which may execute instructions stored in the memory 282. Using the controller 280, the UE 115 may transmit and receive signals via wireless radios 501a-r and antennas 252a-r. The wireless radios 501a-r may include one or more components or devices described herein, such as the modulator/demodulators 254a-r, the MIMO detector 256, the receive processor 258, the transmit processor 264, the TX MIMO processor 266, the transmitter 356, the receiver 358, one or more other components or devices, or a combination thereof.

In some examples, the memory 282 may store instructions executable by one or more processors (e.g., the controller 280) to initiate, perform, or control one or more operations described herein. For example, the memory 282 may store downlink monitoring skipping mode instructions 502 executable by the controller 280 to perform downlink monitoring skipping of one or more carriers, such as any of the carriers 310*a-c*. As another example, the memory 282 may store downlink monitoring skipping mode disabling instructions 504 executable by the controller 280 to disable downlink monitoring skipping for one or more carriers, such as any others of the carriers 310*a-c*.

FIG. 6 is a flow diagram illustrating an example of a method 600 of wireless communication performed by a serving cell of a UE according to one or more aspects. In some examples, the method 600 is performed by one of the base stations 105*a-d* of FIG. 1 or by one of the serving cells 305*a-c* of FIG. 3.

The method 600 includes transmitting one or more control messages configuring a user equipment (UE) to avoid downlink monitoring based on a downlink monitoring skipping mode, at 602. For example, any of the serving cells 305*a-c* may transmit the one or more control messages 320 configuring the UE 115 with the downlink monitoring skipping mode 322.

The method 600 further includes receiving a scheduling request (SR) for a first logical channel (LCH) of the UE, at 604. For example, any of the serving cells 305*a-c* may receive the SR 344 from the UE 115.

The method 600 further includes transmitting an uplink grant to the UE to schedule an uplink transmission associated with the SR, at 606. The UE selectively disables the downlink monitoring skipping mode to receive the uplink grant. For example, any of the serving cells 305*a-c* may transmit the uplink grant 324 to the UE 115, and the UE 115 may selectively disable the downlink monitoring skipping mode 322 to receive the uplink grant 324.

FIG. 7 is a block diagram illustrating an example of the base station 105 according to some aspects of the disclosure. In some examples, the base station 105 of FIG. 7 corresponds to one or more of the serving cells 305*a-c* of FIG. 3.

The base station 105 may include structure, hardware, and components illustrated in FIG. 2. For example, the base station 105 may include the controller 240, which may execute instructions stored in memory 242. Under control of the controller 240, the base station 105 may transmit and receive signals via wireless radios 701*a-t* and antennas 234*a-t*. The wireless radios 701*a-t* may include one or more components or devices described herein, such as the modulator/demodulators 232*a-t*, the MIMO detector 236, the receive processor 238, the transmit processor 220, the TX MIMO processor 230, the transmitter 306, the receiver 308, one or more other components or devices, or a combination thereof.

In some examples, the memory 242 may store instructions executable by one or more processors (e.g., the controller 240) to initiate, perform, or control one or more operations described herein. For example, the memory 242 may store downlink monitoring skipping mode configuration instructions executable by the controller 240 to configure the UE 115 with the downlink monitoring skipping mode 322. As another example, the memory 242 may store self-scheduling instructions 704 executable by the controller 240 to self-schedule the uplink transmission 328 via the uplink grant 324. Alternatively in addition, the memory 242 may store cross-scheduling instructions 706 executable by the controller 240 to cross-schedule the uplink transmission 328 via the uplink grant 324 for another base station.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 8:
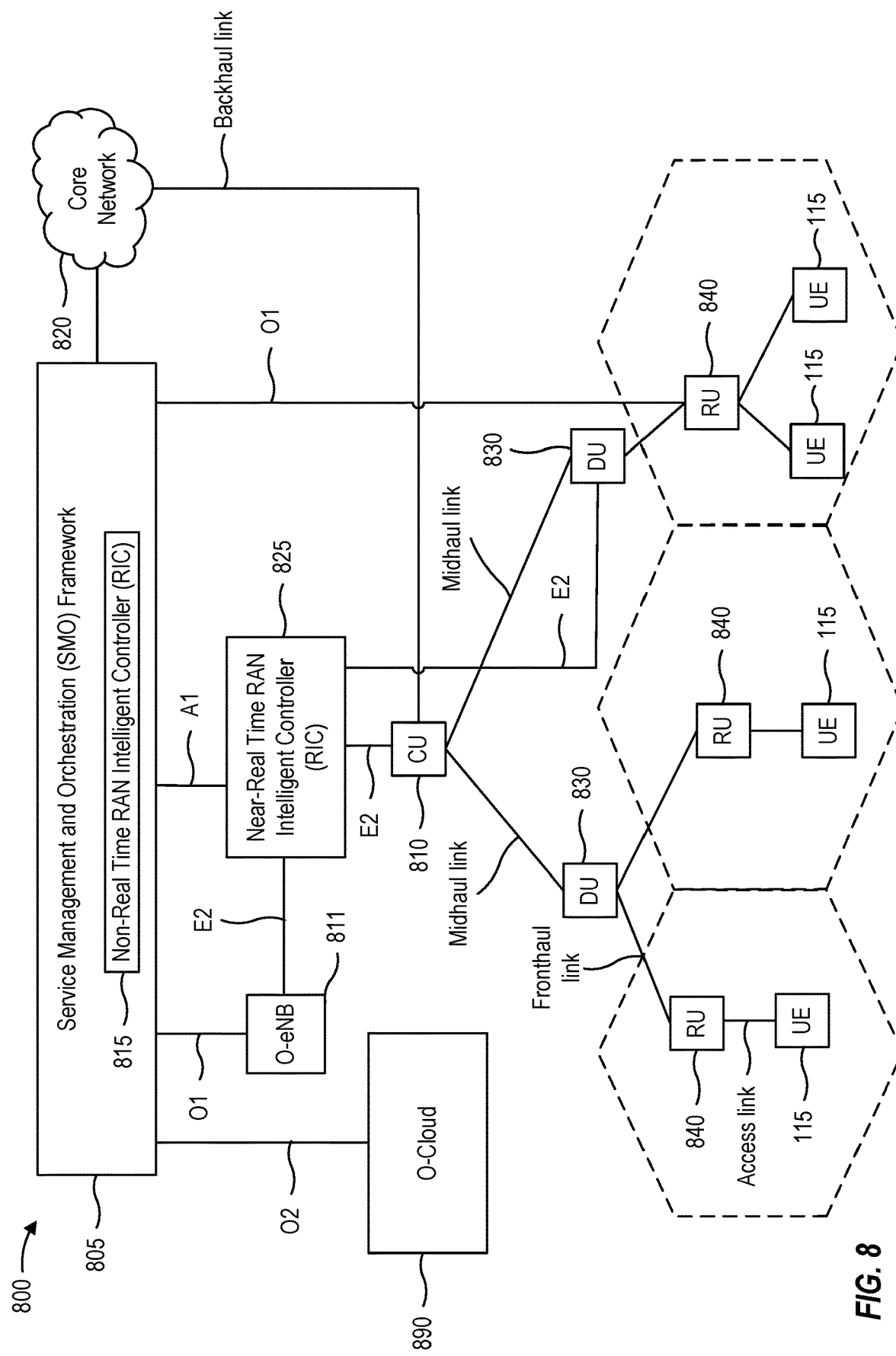
FIG. 8 is a block diagram illustrating an example disaggregated base station architecture according to one or more aspects.

FIG. 8 shows a diagram illustrating an example disaggregated base station 800 architecture. In some examples, the disaggregated base station 800 architecture may be used to implement the base station 105. The disaggregated base station 800 architecture may include one or more central units (CUs) 810 that can communicate directly with a core network 820 via a backhaul link, or indirectly with the core network 820 through one or more disaggregated base station units (such as a Near-Real Time (Near-RT) RAN Intelligent Controller (RIC) 825 via an E2 link, or a Non-Real Time (Non-RT) RIC 815 associated with a Service Management and Orchestration (SMO) Framework 805, or both). A CU 810 may communicate with one or more distributed units (DUs) 830 via respective midhaul links, such as an F1 interface. The DUs 830 may communicate with one or more radio units (RUs) 840 via respective fronthaul links. The RUs 840 may communicate with respective UEs 115 via one or more radio frequency (RF) access links. In some implementations, the UE 115 may be simultaneously served by multiple RUs 840.

Each of the units, i.e., the CUs 810, the DUs 830, the RUs 840, as well as the Near-RT RICs 825, the Non-RT RICs 815 and the SMO Framework 805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 810 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 810. The CU 810 may be configured to handle user plane functionality (i.e., Central Unit-User Plane (CU-UP)), control plane functionality (i.e., Central Unit-Control Plane (CU-CP)), or a combination thereof. In some implementations, the CU 810 can be logically split into one or more CU-UP units and one or more CU-CP units. The CU-UP unit can communicate bidirectionally with the CU-CP unit via an interface, such as the E1 interface when implemented in an O-RAN configuration. The CU 810 can be implemented to communicate with the DU 830, as necessary, for network control and signaling.

The DU 830 may correspond to a logical unit that includes one or more base station functions to control the operation of one or more RUs 840. In some aspects, the DU 830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 830 may further host one or more low PHY layers. Each layer (or module) can be implemented with an interface configured to communicate signals with other layers (and modules) hosted by the DU 830, or with the control functions hosted by the CU 810.

Lower-layer functionality can be implemented by one or more RUs 840. In some deployments, an RU 840, controlled by a DU 830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 840 can be implemented to handle over the air (OTA) communication with one or more UEs 115. In some implementations, real-time and non-real-time aspects of control and user plane communication with the RU(s) 840 can be controlled by the corresponding DU 830. In some scenarios, this configuration can enable the DU(s) 830 and the CU 810 to be implemented in a cloud-based RAN architecture, such as a vRAN architecture.

The SMO Framework 805 may be configured to support RAN deployment and provisioning of non-virtualized and virtualized network elements. For non-virtualized network elements, the SMO Framework 805 may be configured to support the deployment of dedicated physical resources for RAN coverage requirements which may be managed via an operations and maintenance interface (such as an O1 interface). For virtualized network elements, the SMO Framework 805 may be configured to interact with a cloud computing platform (such as an open cloud (O-Cloud) 890) to perform network element life cycle management (such as to instantiate virtualized network elements) via a cloud computing platform interface (such as an O2 interface). Such virtualized network elements can include, but are not limited to, CUs 810, DUs 830, RUs 840 and Near-RT RICs 825. In some implementations, the SMO Framework 805 can communicate with a hardware aspect of a 4G RAN, such as an open eNB (O-eNB) 811, via an O1 interface. Additionally, in some implementations, the SMO Framework 805 can communicate directly with one or more RUs 840 via an O1 interface. The SMO Framework 805 also may include a Non-RT RIC 815 configured to support functionality of the SMO Framework 805.

The Non-RT RIC 815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 825. The Non-RT RIC 815 may be coupled to or communicate with (such as via an A1 interface) the Near-RT RIC 825. The Near-RT RIC 825 may be configured to include a logical function that enables near-real-time control and optimization of RAN elements and resources via data collection and actions over an interface (such as via an E2 interface) connecting one or more CUs 810, one or more DUs 830, or both, as well as an O-eNB, with the Near-RT RIC 825.

In some implementations, to generate AI/ML models to be deployed in the Near-RT RIC 825, the Non-RT RIC 815 may receive parameters or external enrichment information from external servers. Such information may be utilized by the Near-RT RIC 825 and may be received at the SMO Framework 805 or the Non-RT RIC 815 from non-network data sources or from network functions. In some examples, the Non-RT RIC 815 or the Near-RT RIC 825 may be configured to tune RAN behavior or performance. For example, the Non-RT RIC 815 may monitor long-term trends and patterns for performance and employ AI/ML models to perform corrective actions through the SMO Framework 805 (such as reconfiguration via O1) or via creation of RAN management policies (such as A1 policies).

According to some further aspects, in a first aspect, an apparatus for wireless communication by a user equipment (UE) includes a memory and one or more processors coupled to the memory. The one or more processors are configured to receive one or more control messages configuring the UE to avoid downlink monitoring based on a downlink monitoring skipping mode. The one or more processors are further configured, based on a scheduling request (SR) for a first logical channel (LCH) associated with the UE, to perform the downlink monitoring of a first carrier for an uplink grant that schedules an uplink transmission associated with the SR and to avoid the downlink monitoring according to the downlink monitoring skipping mode for a second carrier associated with a second serving cell of the UE. The first carrier is associated with a first serving cell of the UE.

In a second aspect in addition to the first aspect, the first serving cell corresponds to a self-scheduled cell that is included in a first set of allowed serving cells associated with the first LCH.

In a third aspect in addition to any of the first through second aspects, the first serving cell is configured to cross-schedule at least one serving cell that is included in a first set of allowed serving cells associated with the first LCH.

In a fourth aspect in addition to any of the first through third aspects, the at least one serving cell corresponds to an uplink-only cell.

In a fifth aspect in addition to any of the first through fourth aspects, the first serving cell corresponds to a downlink-only cell.

In a sixth aspect in addition to any of the first through fifth aspects, the at least one serving cell corresponds to an uplink-only cell, and the first serving cell corresponds to a downlink-only cell.

In a seventh aspect in addition to any of the first through sixth aspects, the first LCH and a second LCH associated with the UE are both associated with a same SR resource configuration, and the one or more processors are further configured to perform, based on the SR, the downlink monitoring for a group of serving cells including the first serving cell.

In an eighth aspect in addition to any of the second through seventh aspects, the group of serving cells corresponds to a union of a first set of allowed serving cells associated with the first LCH and a second set of allowed serving cells associated with the second LCH.

In a ninth aspect in addition to any of the second through eighth aspects, the one or more processors are further configured to initiate transmission of the SR and to initiate the downlink monitoring of the first carrier for the uplink grant based on detecting completion of the transmission of the SR.

In a tenth aspect in addition to any of the second through ninth aspects, the one or more processors are further configured to: prior to transmission of the SR, initiate transmission of a buffer status report (BSR), where transmission of the BSR cancels the SR; and based on a particular BSR type associated with the BSR, determine whether to perform the downlink monitoring.

In an eleventh aspect in addition to any of the second through tenth aspects, based on the particular BSR type corresponding to one of a regular BSR type or to a periodic BSR type, the one or more processors are further configured to perform the downlink monitoring for a plurality of carriers including the first carrier.

In a twelfth aspect in addition to any of the second through eleventh aspects, based on the particular BSR type corresponding to a padding BSR type, the one or more processors are further configured to avoid the downlink monitoring according to the downlink monitoring skipping mode.

In a thirteenth aspect, a method of wireless communication performed by a user equipment (UE) includes receiving one or more control messages configuring the UE to avoid downlink monitoring based on a downlink monitoring skipping mode. The method further includes, based on a scheduling request (SR) for a first logical channel (LCH) associated with the UE, performing the downlink monitoring of a first carrier for an uplink grant that schedules an uplink transmission associated with the SR and avoiding the downlink monitoring according to the downlink monitoring skipping mode for a second carrier associated with a second serving cell of the UE. The first carrier is associated with a first serving cell of the UE.

In a fourteenth aspect in addition to the thirteenth aspect, the first serving cell corresponds to a self-scheduled cell that is included in a first set of allowed serving cells associated with the first LCH.

In a fifteenth aspect in addition to any of the thirteenth through fourteenth aspects, the first serving cell cross-schedules at least one serving cell that is included in a first set of allowed serving cells associated with the first LCH.

In a sixteenth aspect in addition to any of the thirteenth through fifteenth aspects, the at least one serving cell corresponds to an uplink-only cell that is cross-scheduled by the first serving cell.

In a seventeenth aspect in addition to any of the thirteenth through sixteenth aspects, the first serving cell corresponds to a downlink-only cell that cross-schedules the at least one serving cell.

In an eighteenth aspect in addition to any of the thirteenth through seventeenth aspects, the at least one serving cell corresponds to an uplink-only cell that is cross-scheduled by the first serving cell, and the first serving cell corresponds to a downlink-only cell that cross-schedules the at least one serving cell.

In a nineteenth aspect in addition to any of the thirteenth through eighteenth aspects, the first LCH and a second LCH associated with the UE are both associated with a same SR resource configuration, and based on the SR, the UE performs the downlink monitoring for a group of serving cells including the first serving cell.

In a twentieth aspect in addition to any of the thirteenth through nineteenth aspects, the group of serving cells corresponds to a union of a first set of allowed serving cells associated with the first LCH and a second set of allowed serving cells associated with the second LCH.

In a twenty-first aspect in addition to any of the thirteenth through twentieth aspects, the method includes performing transmission of the SR, and the UE initiates the downlink monitoring of the first carrier for the uplink grant based on detecting completion of the transmission of the SR.

In a twenty-second aspect in addition to any of the thirteenth through twenty-first aspects, the method includes, prior to transmission of the SR, transmitting a buffer status report (BSR), where transmission of the BSR cancels the SR, and based on a particular BSR type associated with the BSR, determining whether to perform the downlink monitoring.

In a twenty-third aspect in addition to any of the thirteenth through twenty-second aspects, based on the particular BSR type corresponding to one of a regular BSR type or to a periodic BSR type, the UE performs the downlink monitoring for a plurality of carriers including the first carrier.

In a twenty-fourth aspect in addition to any of the thirteenth through twenty-third aspects, based on the particular BSR type corresponding to a padding BSR type, the UE avoids the downlink monitoring according to the downlink monitoring skipping mode.

In a twenty-fifth aspect, an apparatus for wireless communication by a serving cell of a user equipment (UE) includes a memory and one or more processors coupled to the memory. The one or more processors are configured to initiate transmission of one or more control messages configuring a user equipment (UE) to avoid downlink monitoring based on a downlink monitoring skipping mode. The one or more processors are further configured to receive a scheduling request (SR) for a first logical channel (LCH) of the UE. The one or more processors are further configured to initiate transmission of an uplink grant to the UE to schedule an uplink transmission associated with the SR. The UE is configured to selectively disable the downlink monitoring skipping mode to receive the uplink grant.

In a twenty-sixth aspect in addition to the twenty-fifth aspect, the serving cell corresponds to a self-scheduled cell that is included in a first set of allowed serving cells associated with the first LCH, and the one or more processors are further configured to receive the uplink the uplink transmission from the UE based on the uplink grant.

In a twenty-seventh aspect in addition to the twenty-fifth aspect, the serving cell is configured to cross-schedule at least one serving cell that is included in a first set of allowed serving cells associated with the first LCH and that is to receive the uplink transmission from the UE.

In a twenty-eighth aspect in addition to any of the first through twenty-seventh aspects, a method of wireless communication performed by a serving cell of a user equipment (UE) includes transmitting one or more control messages configuring a user equipment (UE) to avoid downlink monitoring based on a downlink monitoring skipping mode. The method further includes receiving a scheduling request (SR) for a first logical channel (LCH) of the UE. The method further includes transmitting an uplink grant to the UE to schedule an uplink transmission associated with the SR. The UE selectively disables the downlink monitoring skipping mode to receive the uplink grant.

In a twenty-ninth aspect in addition to the twenty-eighth aspect, the first serving cell corresponds to a self-scheduled cell that is included in a first set of allowed serving cells associated with the first LCH, and further comprising receiving the uplink the uplink transmission from the UE based on the uplink grant.

In a thirtieth aspect in addition to the twenty-eighth aspect, the first serving cell cross-schedules at least one serving cell that is included in a first set of allowed serving cells associated with the first LCH and that is to receive the uplink transmission from the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, one or more features discussed herein may be implemented via specialized processor circuitry, via executable instructions, or combinations thereof.

Those of skill would further appreciate that the various illustrative logical blocks, modules, circuits, and operations described in connection with the disclosure herein may be implemented as electronic hardware, computer software, or combinations of both. To illustrate, various illustrative components, blocks, modules, circuits, and operations may be described generally in terms of their functionality. Whether such functionality is implemented as hardware or software may depend upon the particular application and design of the overall system. Skilled artisans may implement the described functionality in varying ways for each particular application, but such implementation decisions should not be interpreted as causing a departure from the scope of the present disclosure.

A hardware and data processing apparatus used to implement the various illustrative logics, logical blocks, modules and circuits described in connection with one or more aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, one or more functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, such as one or more modules of computer program instructions, encoded on a computer storage media for execution by, or to control the operation of, data processing apparatus.

If implemented in software, one or more functions may be stored on or transmitted over as one or more instructions or code on a computer-readable medium. The processes of a method or process disclosed herein may be implemented in a processor-executable software module which may reside on a computer-readable medium. Computer-readable media includes computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the scope of this disclosure. Thus, the claims are not intended to be limited to the implementations shown herein, but are to be accorded the widest scope consistent with this disclosure, the principles and the novel features disclosed herein.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication by a user equipment (UE), the apparatus comprising:
    a memory; and
    one or more processors coupled to the memory and configured to:
        receive one or more control messages configuring the UE to avoid downlink monitoring in accordance with a downlink monitoring skipping mode;
        transmit a buffer status report (BSR) associated with a first logical channel (LCH) associated with the UE; and
        in accordance with the BSR:
            perform the downlink monitoring of a first carrier for an uplink grant that schedules an uplink transmission, wherein the first carrier is associated with a first serving cell of the UE; and
            avoid the downlink monitoring according to the downlink monitoring skipping mode for a second carrier associated with a second serving cell of the UE.

2. The apparatus of claim 1, wherein the first serving cell corresponds to a self-scheduled cell that is included in a first set of allowed serving cells associated with the first LCH.

3. The apparatus of claim 1, wherein the first serving cell is configured to cross-schedule at least one serving cell that is included in a first set of allowed serving cells associated with the first LCH.

4. The apparatus of claim 3, wherein the at least one serving cell corresponds to an uplink-only cell.

5. The apparatus of claim 3, wherein the first serving cell corresponds to a downlink-only cell.

6. The apparatus of claim 3, wherein the at least one serving cell corresponds to an uplink-only cell, and wherein the first serving cell corresponds to a downlink-only cell.

7. The apparatus of claim 1, wherein the first LCH and a second LCH associated with the UE are both associated with a same SR resource configuration, and wherein the one or more processors are further configured to perform, the downlink monitoring for a group of serving cells including the first serving cell.

8. The apparatus of claim 7, wherein the group of serving cells corresponds to a union of a first set of allowed serving cells associated with the first LCH and a second set of allowed serving cells associated with the second LCH.

9. The apparatus of claim 1, wherein transmission of the BSR cancels a scheduling request (SR) associated with the first logical channel, and wherein the one or more processors are further configured to determine, in accordance with a particular BSR type associated with the BSR, whether to perform the downlink monitoring.

10. The apparatus of claim 9, wherein, based on the particular BSR type corresponding to one of a regular BSR type or to a periodic BSR type, the one or more processors are further configured to perform the downlink monitoring for a plurality of carriers including the first carrier.

11. The apparatus of claim 9, wherein, based on the particular BSR type corresponding to a padding BSR type, the one or more processors are further configured to avoid the downlink monitoring according to the downlink monitoring skipping mode.

12. The apparatus of claim 1, wherein the one or more processors are further configured to initiate a scheduling request (SR) associated with the first LCH, and wherein transmission of the BSR cancels the SR.

13. The apparatus of claim 1, wherein one or more of performing the downlink monitoring of the first carrier or avoiding the downlink monitoring for the second carrier are further based on a particular BSR type associated with the BSR.

14. The apparatus of claim 13, wherein the one or more processors are further configured to:
    perform the downlink monitoring for the first carrier in accordance with the particular BSR type corresponding to one of a regular BSR type or to a periodic BSR type; or
    avoid the downlink monitoring for the second carrier in accordance with the particular BSR type corresponding to a padding BSR type.

15. A method of wireless communication performed by a user equipment (UE), the method comprising:
    receiving one or more control messages configuring the UE to avoid downlink monitoring in accordance with a downlink monitoring skipping mode;
    transmitting a buffer status report (BSR) associated with a first logical channel (LCH) associated with the UE; and
    in accordance with the BSR:
        performing the downlink monitoring of a first carrier for an uplink grant that schedules an uplink transmission, wherein the first carrier is associated with a first serving cell of the UE; and
        avoiding the downlink monitoring according to the downlink monitoring skipping mode for a second carrier associated with a second serving cell of the UE.

16. The method of claim 15, wherein the first serving cell corresponds to a self-scheduled cell that is included in a first set of allowed serving cells associated with the first LCH.

17. The method of claim 15, wherein the first serving cell cross-schedules at least one serving cell that is included in a first set of allowed serving cells associated with the first LCH.

18. The method of claim 17, wherein the at least one serving cell corresponds to an uplink-only cell that is cross-scheduled by the first serving cell.

19. The method of claim 17, wherein the first serving cell corresponds to a downlink-only cell that cross-schedules the at least one serving cell.

20. The method of claim 17, wherein the at least one serving cell corresponds to an uplink-only cell that is cross-scheduled by the first serving cell, and wherein the first serving cell corresponds to a downlink-only cell that cross-schedules the at least one serving cell.

21. The method of claim 15, wherein the first LCH and a second LCH and a second LCH associated with the UE are both associated with a same SR resource configuration, and wherein, the UE performs the downlink monitoring for a group of serving cells including the first serving cell.

22. The method of claim 15, wherein transmitting the BSR cancels a scheduling request (SR) associated with the first logical channel, and further comprising:
based on a particular BSR type associated with the BSR, determining whether to perform the downlink monitoring.

23. The method of claim 22, wherein, based on the particular BSR type corresponding to one of a regular BSR type or to a periodic BSR type, the UE performs the downlink monitoring for a plurality of carriers including the first carrier.

24. The method of claim 22, wherein, based on the particular BSR type corresponding to a padding BSR type, the UE avoids the downlink monitoring according to the downlink monitoring skipping mode.

25. An apparatus for wireless communication by a serving cell of a user equipment (UE), the apparatus comprising:
a memory; and
one or more processors coupled to the memory and configured to:
initiate transmission of one or more control messages configuring a user equipment (UE) to avoid downlink monitoring in accordance with a downlink monitoring skipping mode;
receiving a buffer status report (BSR) associated with a first logical channel (LCH) associated with the UE; and
initiate transmission of an uplink grant to the UE to schedule an uplink transmission, wherein the UE is configured to selectively disable the downlink monitoring skipping mode in accordance with the BSR to receive the uplink grant.

26. The apparatus of claim 25, wherein the serving cell corresponds to a self-scheduled cell that is included in a first set of allowed serving cells associated with the first LCH, and wherein the one or more processors are further configured to receive the uplink transmission from the UE based on the uplink grant.

27. The apparatus of claim 25, wherein the serving cell is configured to cross-schedule at least one serving cell that is included in a first set of allowed serving cells associated with the first LCH and that is to receive the uplink transmission from the UE.

28. A method of wireless communication performed by a serving cell of a user equipment (UE), the method comprising:
transmitting one or more control messages configuring a user equipment (UE) to avoid downlink monitoring in accordance with a downlink monitoring skipping mode;
receiving a buffer status report (BSR) associated with a first logical channel (LCH) associated with the UE; and
transmitting an uplink grant to the UE to schedule an uplink transmission, wherein the UE selectively disables the downlink monitoring skipping mode in accordance with the BSR to receive the uplink grant.

29. The method of claim 28, wherein the first serving cell corresponds to a self-scheduled cell that is included in a first set of allowed serving cells associated with the first LCH, and further comprising receiving the uplink transmission from the UE based on the uplink grant.

30. The method of claim 28, wherein the first serving cell cross-schedules at least one serving cell that is included in a first set of allowed serving cells associated with the first LCH and that is to receive the uplink transmission from the UE.

* * * * *